US009888211B1

(12) United States Patent
Browne et al.

(10) Patent No.: US 9,888,211 B1
(45) Date of Patent: Feb. 6, 2018

(54) REPLACING LIVE VIDEO OF A MEETING PARTICIPANT WITH RECORDED VIDEO OF THE MEETING PARTICIPANT DURING AN ONLINE MEETING

(71) Applicant: GetGo, Inc., Boston, MA (US)

(72) Inventors: Jeffrey Casper Browne, San Francisco, CA (US); Mengqian Liu, Goleta, CA (US)

(73) Assignee: GetGo, Inc., Boston, MA (US)

( * ) Notice: Subject to any disclaimer, the term of this patent is extended or adjusted under 35 U.S.C. 154(b) by 0 days.

(21) Appl. No.: 15/369,005

(22) Filed: Dec. 5, 2016

(51) Int. Cl.
*H04N 7/15* (2006.01)
*H04L 29/06* (2006.01)
*G06K 9/00* (2006.01)
*H04N 5/265* (2006.01)
*H04N 5/262* (2006.01)
*H04L 29/08* (2006.01)

(52) U.S. Cl.
CPC ........... *H04N 7/15* (2013.01); *G06K 9/00718* (2013.01); *H04L 65/403* (2013.01); *H04N 5/265* (2013.01); *H04N 5/2621* (2013.01); *H04L 67/02* (2013.01)

(58) Field of Classification Search
USPC ...................................................... 348/14.07
See application file for complete search history.

(56) References Cited

U.S. PATENT DOCUMENTS

2014/0340468 A1  11/2014 Winterstein
2015/0067026 A1  3/2015 Christiansen et al.
2015/0067542 A1  3/2015 Anderson et al.
2015/0092009 A1* 4/2015 DeLuca .................... H04N 7/15
                                                                  348/14.08
2015/0237303 A1  8/2015 Thapliyal et al.
2017/0064254 A1* 3/2017 Mueller ................. H04N 7/155

OTHER PUBLICATIONS

Davis, Abe, et al, "Image-Space Modal Bases for Plausible Manipulation of Objects in Video," ACM Transactions on Graphics, vol. 34, Nov. 2015, pp. 1-7, No. 6, Article 239.
Mori, Greg, et al, "Video Based Motion Synthesis by Splicing and Morphing," Report No. UCB/CSD-4-1337, Computer Science Division (EECS), University of California, Jun. 2004, pp. 1-17, Berkeley, CA 94720.
Schodl, Arno, et al, "Video Textures," SIGGRAPH 2000, 2000, pp. 489-498, New Orleans, LA USA.

* cited by examiner

*Primary Examiner* — Amal Zenati
(74) *Attorney, Agent, or Firm* — BainwoodHuang

(57) ABSTRACT

A technique involves electronically providing live video of a first participant of the online meeting to a set of other participants of the online meeting. The live video displays live physical movement of the first participant. The technique further involves receiving a live video replacement command from the first participant after electronically providing the live video of the first participant of the online meeting to the set of other participants of the online meeting. The technique further involves electronically providing recorded video of the first participant of the online meeting to the set of other participants of the online meeting in place of the live video in response to the live video replacement command. The recorded video displays recorded physical movement of the first participant. Such operation affords the first participant with a period of privacy during the online meeting without calling attention to the video's change in state.

23 Claims, 7 Drawing Sheets

REPLACING LIVE VIDEO OF A MEETING PARTICIPANT WITH RECORDED VIDEO OF THE MEETING PARTICIPANT DURING AN ONLINE MEETING

BACKGROUND

A typical web conference involves sharing content among multiple conference participants. In particular, the conference participants are able to watch visual content (e.g., webcam video of each conference participant, etc.), as well as share audio content (e.g., ask questions and inject comments) to form a collaborative exchange even though the conference participants may be scattered among remote geographical locations.

To form such a web conference, each conference participant connects a respective computerized device (e.g., a desktop computer, an electronic tablet, a smart phone, etc.) to a central web conference server over a computer network. The central web conference server then conveys a view from the camera of each conference participant's computerized device to the computerized devices of the other conference participants. Additionally, the central web conference server shares audio among the computerized devices of the conference participants.

SUMMARY

It should be understood that there are deficiencies to the above-described conventional web conference. Along these lines, suppose that a conference participant wishes to block the view from the camera of the conference participant's computerized device. For example, the conference participant may be working from home and wish to block a view of a family member that has walked into the background. As another example, the conference participant may be using a desktop computer and need to get up to open a door, etc.

In these situations, the conference participant may choose to temporarily suspend or "pause" the video provided by the conference participant's camera. Unfortunately, if the conference participant pauses the video by replacing the camera view with a blank screen, the other conference participants may take notice and be distracted from their conversation. Sometimes, the conference participants may even make remarks about the blank screen such as questioning whether the paused participant was accidentally disconnected from the conference. In some situations, the blank screen may even derail the conference (e.g., out of consideration for the paused participant, the other participants may choose to wait until the paused participant removes the blank screen).

In contrast to the above-described conventional approaches, improved techniques are directed to replacing live video of a meeting participant with recorded video of the meeting participant during an online meeting. While the recorded video is playing in place of the live video, the other meeting participants view the recorded video rather than the live video. During this time, the meeting participant may address particular situations such as wait for a family member to exit the background, get up and open a door, etc. When the meeting participant is ready to share live video again, the recorded video of the meeting participant is replaced with new live video of the meeting participant. These transitions from live video to recorded video and back may occur seamlessly without distracting the other meeting participants.

One embodiment is directed to a method of conducting an online meeting. The method includes electronically providing, by processing circuitry, live video of a first participant (or user) of the online meeting to a set of other participants of the online meeting. The live video displays live physical movement of the first participant. The method further includes receiving, by the processing circuitry, a live video replacement command from the first participant after electronically providing the live video of the first participant of the online meeting to the set of other participants of the online meeting. The method further includes electronically providing, by the processing circuitry, recorded video of the first participant of the online meeting to the set of other participants of the online meeting in place of the live video in response to the live video replacement command. The recorded video displays recorded physical movement of the first participant. Such operation affords the first participant with a period of privacy during the online meeting without calling attention to the video's change in state.

In some arrangements, the method further includes receiving, by the processing circuitry, a live video restore command from the first participant after electronically providing the recorded video of the first participant of the online meeting to the set of other participants of the online meeting and, in response to the live video restore command, electronically providing, by the processing circuitry, new live video of the first participant of the online meeting to the set of other participants of the online meeting in place of the recorded video. The new live video displays new live physical movement of the first participant.

In some arrangements, the method further includes, while the live video of the first participant is provided to the set of other participants, providing live video of the set of other participants to the first participant. In some arrangements, the method further includes, while the recorded video of the first participant is provided to the set of other participants, providing live video of the set of other participants to the first participant. In some arrangements, the method further includes, while the new live video of the first participant is provided to the set of other participants, providing live video of the set of other participants to the first participant.

In some arrangements, electronically providing the live video of the first participant to the set of other participants of the online meeting includes conveying a real time video feed of the first participant from a camera to the set of other participants of the online meeting. In some arrangements, electronically providing the recorded video of the first participant to the set of other participants of the online meeting includes conveying a recorded video feed of the first participant from computerized memory to the set of other participants of the online meeting, the recorded video feed being different from the real time video feed. In some arrangements, electronically providing the new live video of the first participant to the set of other participants of the online meeting includes conveying a new real time video feed of the first participant from the camera to the set of other participants of the online meeting, the new real time video feed being different from the recorded video feed.

In some arrangements, Electronically providing the recorded video of the first participant to the set of other participants of the online meeting further includes, while conveying the real time video feed of the first participant from the camera to the set of other participants of the online meeting, making a recording of at least a portion of the real time video feed of the first participant in the computerized memory. Here, the processing circuitry may purposefully maintain several seconds or more of the recording in a buffer even though the real time video feed has been conveyed to the other participants.

In some arrangements, the recording of the real time video feed includes a recorded series of frames. Here, conveying the recorded video feed of the first participant from computerized memory to the set of other participants includes playing at least some of the recorded series of frames to the set of other participants.

In some arrangements, the recorded series of frames includes a video clip. Here, playing at least some of the recorded series of frames to the set of other participants includes playing the video clip to the set of other participants multiple times as a video loop.

In some arrangements, the method further includes performing a set of frame matching operations that matches frames among the recorded series of frames. The set of frame matching operations identifies a beginning frame of the video clip and an ending frame of the video clip. The beginning frame matches the ending frame within a predefined frame matching threshold.

In some arrangements, the method further includes, in response to the live video replacement command and prior to conveying the recorded video feed of the first participant from computerized memory to the set of other participants of the online meeting, performing a set of frame matching operations that matches frames between (i) frames of the real time video feed of the first participant and (ii) the recorded series of frames. Here, the set of frame matching operations identifies a transition (e.g., a frame sequence) from the real time video feed to the recorded video feed in response to matching a current frame of the real time video feed of the first participant and a particular frame of recorded series of frames within a predefined frame matching threshold.

In some arrangements, the method further includes, in response to the live video restore command and prior to conveying the new real time video feed of the first participant from the camera to the set of other participants of the online meeting, performing a set of frame matching operations that matches frames between (i) the recorded series of frames and (ii) frames of the new real time video feed of the first participant. Here, the set of frame matching operations identifying a transition from the recorded video feed to the new real time video feed in response to matching a particular frame of recorded series of frames and a current frame of the new real time video feed of the first participant within a predefined frame matching threshold.

In some arrangements, the method further includes, while conveying the real time video feed of the first participant from the camera to the set of other participants of the online meeting, rendering the real time video feed of the first participant on an electronic display to the first participant. Here, the first participant is able to view the real time video feed of the first participant that is currently shared with the other participants.

In some arrangements, the method further includes, while conveying the real time video feed of the first participant from the camera to the set of other participants of the online meeting, further rendering a live video replacement command prompt on the electronic display to the first participant. The first participant actuates the live video replacement command prompt to provide the live video replacement command to the processing circuitry.

In some arrangements, the method further includes, while conveying the recorded video feed of the first participant from the computerized memory to the set of other participants of the online meeting, rendering the recorded video feed of the first participant on the electronic display to the first participant. Here, the first participant is able to view the recorded video feed of the first participant that is currently shared with the other participants.

In some arrangements, the method further includes, while conveying the recorded video feed of the first participant from the computerized memory to the set of other participants of the online meeting, further rendering a live video restore command prompt on the electronic display to the first participant. The first participant actuates the live video restore command prompt to provide the live video restore command to the processing circuitry.

In some arrangements, the method further includes, after the live video replacement command prompt is actuated and before the recorded video feed of the first participant is conveyed from the computerized memory to the set of other participants of the online meeting, displaying a warning notification on the electronic display to the first participant. The warning notification indicates that the real time video feed of the first participant is currently being conveyed from the camera to the set of other participants of the online meeting.

In some arrangements, the method further includes, after the live video restore command prompt is actuated and before the new real time video feed of the first participant is conveyed from the computerized memory to the set of other participants of the online meeting, generating a visual effect between the recorded video feed and the new real time video feed to provide a controlled transition between the recorded video feed and the new real time video feed. Such a visual effect may be provided to soften what would otherwise be a distracting visual effect that would risk disrupting the current conversation.

In some arrangements, the method further includes, prior to providing the recorded video in place of the live video, (i) selecting a set of image portions from actual captured video containing period motion of the first participant, (ii) extracting the selected set of image portions from the actual captured video, and (iii) incorporating the selected set of image portions within a set of artificially generated frames and integrating the set of artificially generated frames into the recorded video. Such a set of image portions may include periodic/repetitious behavioral movement such as eye movement, lip movement, etc.

Another embodiment is directed to a computer program product having a non-transitory computer readable medium that stores a set of instructions to conduct an online meeting. The set of instructions, when carried out by computerized circuitry, causing the computerized circuitry to perform a method of:

(A) electronically providing live video of a first participant of the online meeting to a set of other participants of the online meeting, the live video displaying live physical movement of the first participant;

(B) after electronically providing the live video of the first participant of the online meeting to the set of other participants of the online meeting, receiving a live video replacement command from the first participant; and (C) in response to the live video replacement command, electronically providing recorded video of the first participant of the online meeting to the set of other participants of the online meeting in place of the live video, the recorded video displaying recorded physical movement of the first participant.

Yet another embodiment is directed to an electronic apparatus which includes an electronic display, memory, and control circuitry coupled to the electronic display and the memory. The memory stores instructions that, when carried out by the control circuitry, cause the control circuitry to:

(A) electronically provide live video of a first participant of the online meeting to a set of other participants of the online meeting, the live video displaying live physical movement of the first participant;

(B) after electronically providing the live video of the first participant of the online meeting to the set of other participants of the online meeting, receive a live video replacement command from the first participant; and (C) in response to the live video replacement command, electronically provide recorded video of the first participant of the online meeting to the set of other participants of the online meeting in place of the live video, the recorded video displaying recorded physical movement of the first participant.

It should be understood that, in the cloud context, some electronic circuitry is formed by remote computer resources distributed over a network. Such a computerized environment is capable of providing certain advantages such as distribution of hosted services and resources (e.g., software as a service, platform as a service, infrastructure as a service, etc.), enhanced scalability, etc.

Other embodiments are directed to electronic systems and apparatus, processing circuits, computer program products, and so on. Some embodiments are directed to various methods, electronic components and circuitry that are involved in replacing live video of a meeting participant with recorded video of the meeting participant during an online meeting or similar type of electronic conference.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to replacing live video of a meeting participant (or user) with recorded video of the meeting participant during an online meeting. While the recorded video is playing in place of the live video, the other meeting participants view the recorded video rather than the live video. During this time, the meeting participant may address particular situations such as wait for a family member to exit the background, get up and open a door, and so on without causing a disruption during the online meeting. When the meeting participant is ready to share live video again, the recorded video of the meeting participant is replaced with new live video of the meeting participant. These transitions from live video to recorded video and back may occur seamlessly without distracting the other meeting participants (e.g., by performing a set of frame matching operations to soften the video transitions).

The individual features of the particular embodiments, examples, and implementations disclosed herein can be combined in any desired manner that makes technological sense. Moreover, such features are hereby combined in this manner to form all possible combinations, permutations and variants except to the extent that such combinations, permutations and/or variants have been explicitly excluded or are impractical. Support for such combinations, permutations and variants is considered to exist in this document.

Figure 1:
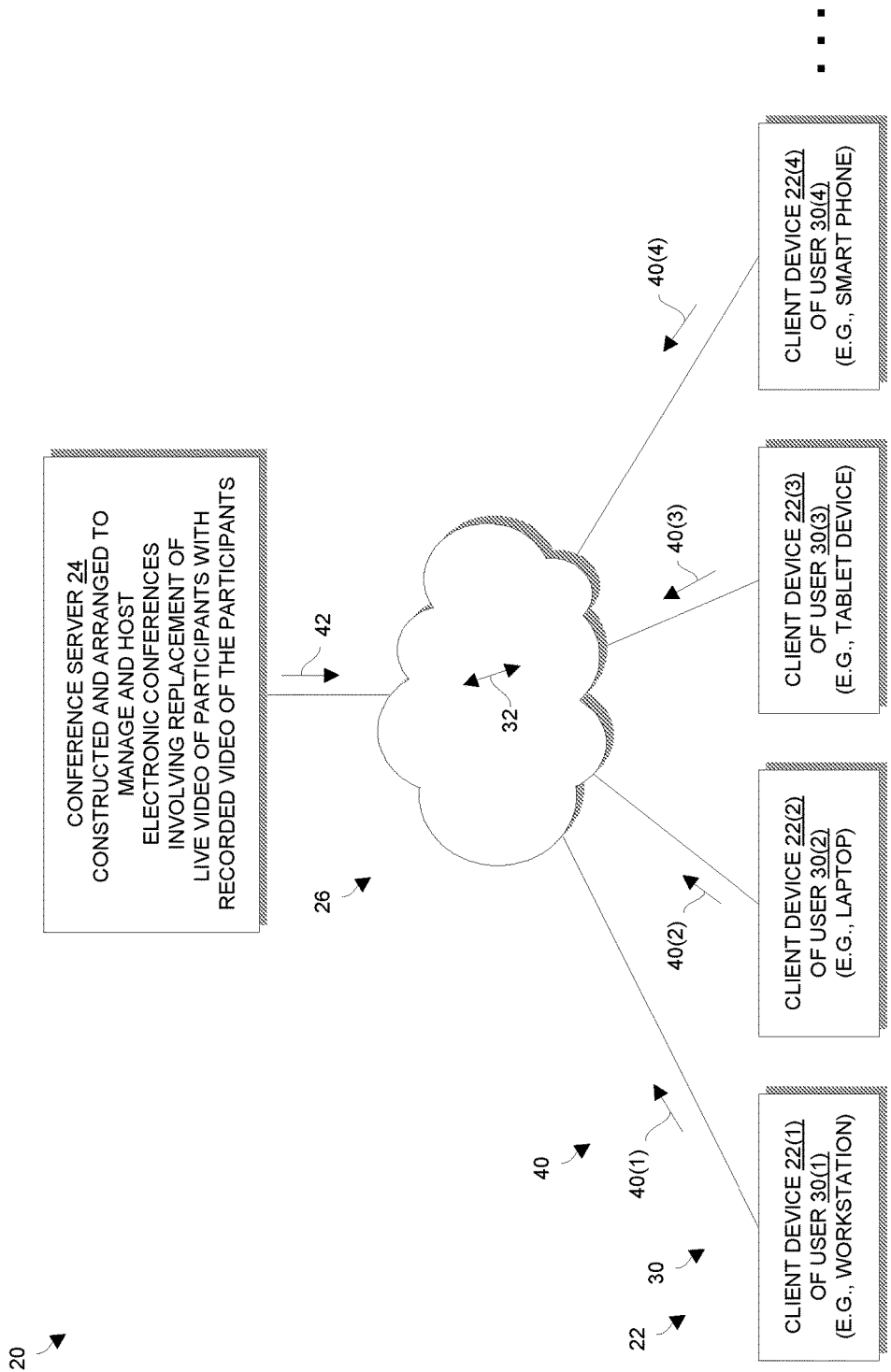
FIG. 1 is a block diagram of a computerized online collaboration setting that replaces live video of a meeting participant with recorded video of the meeting participant during an online meeting.

FIG. 1 shows a computerized online collaboration setting 20 that replaces live video of a meeting participant with recorded video of the meeting participant during an electronic collaboration session such as an online meeting. The computerized online collaboration setting 20 includes client devices 22(1), 22(2), 22(3), 22(4), . . . (collectively, client devices 22), a conference server 24, and a communications medium 26.

Each client device 22 is constructed and arranged to perform useful work on behalf of a respective user 30 (i.e., a human using that client device 22). Along these lines, each client device 22 enables its respective user 30 to participate in an online meeting or similar type of electronic conference (e.g., a webinar, a presentation, etc.). By way of example only, the client device 22(1) is a computerized workstation or desktop computer operated by a user 30(1). Additionally, the client device 22(2) is a laptop computer operated by a user 30(2), the client device 22(3) is a tablet device operated by a user 30(3), the client device 22(4) is a smart phone operated by a user 30(4), and so on. Other types of electronic apparatus are suitable for use as well such as computerized terminals, dedicated conferencing equipment, and so on.

The conference server 24 is constructed and arranged to manage (or host) electronic conferences among the users 24. Along these lines, for an online meeting, the conference server 24 conveys a video feed from each user 30 to the other users 30 attending the online meeting. Additionally, the conference server 24 shares an audio feed from each user 30 with the other users 30 attending the online meeting. In some arrangements, the conference server 24 is remote from one or more of the client devices 22 (e.g., the conference server 34 resides at a central facility, at a server farm, is distributed among multiple campuses, in the cloud, etc.).

The communications medium 26 is constructed and arranged to connect the various components of the online collaboration setting 20 together to enable these components to exchange electronic signals 32 (e.g., see the double arrow 32). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based data communications devices and cabling, fiber optic devices and cabling, wireless devices, combinations thereof, and so on. Furthermore, some portions of the communications medium 26 may be publicly accessible (e.g., the Internet), while other portions of the communications medium 26 are restricted (e.g., a private LAN, an enterprise network, etc.).

During operation, two or more client devices 22 communicate with the conference server 24 to join and participate in an online meeting. To this end, each client device 22 provides a respective set of participant signals 40(1), 40(2), 40(3), 40(4) (collectively, participant signals 40) to the conference server 24. Each set of participant signals 40 may include a video signal representing participant video (e.g., a feed from a webcam, a camera, etc.), an audio signal representing participant audio (e.g., an audio feed from a user's headset, from a user's phone, etc.), and additional signals (e.g., connection and setup information, a participant profile, client device information, status and support data, etc.).

Upon receipt of the sets of participant signals 40 from the client devices 22, the conference server 24 processes the sets of participant signals 40 and transmits a set of conference signals 42 to the client devices 22. In particular, the set of conference signals 42 may include a set of video signals representing conference video (e.g., individual video feeds from each user 30, a presenter's desktop or slideshow, etc.), a set of audio signals representing conference audio (e.g., an aggregate audio signal which includes audio signals from one or more of the participants mixed together, etc.), and additional signals (e.g., connection and setup commands and information, conference information, status and support data, etc.).

As will be discussed in further detail shortly, during the online meeting, specialized circuitry is constructed and arranged to improve the quality of the experience of the users 30 by replacing live video of a meeting participant with recorded video of the meeting participant in response to a command. This recorded video may include a video clip of the meeting participant that was shared with the other meeting participants in the online meeting just a few moments earlier. Moreover, such replacement may occur seamlessly and thus not distract the online meeting discussion. Further details will now be provided with reference to FIG. 2.

Figure 2:
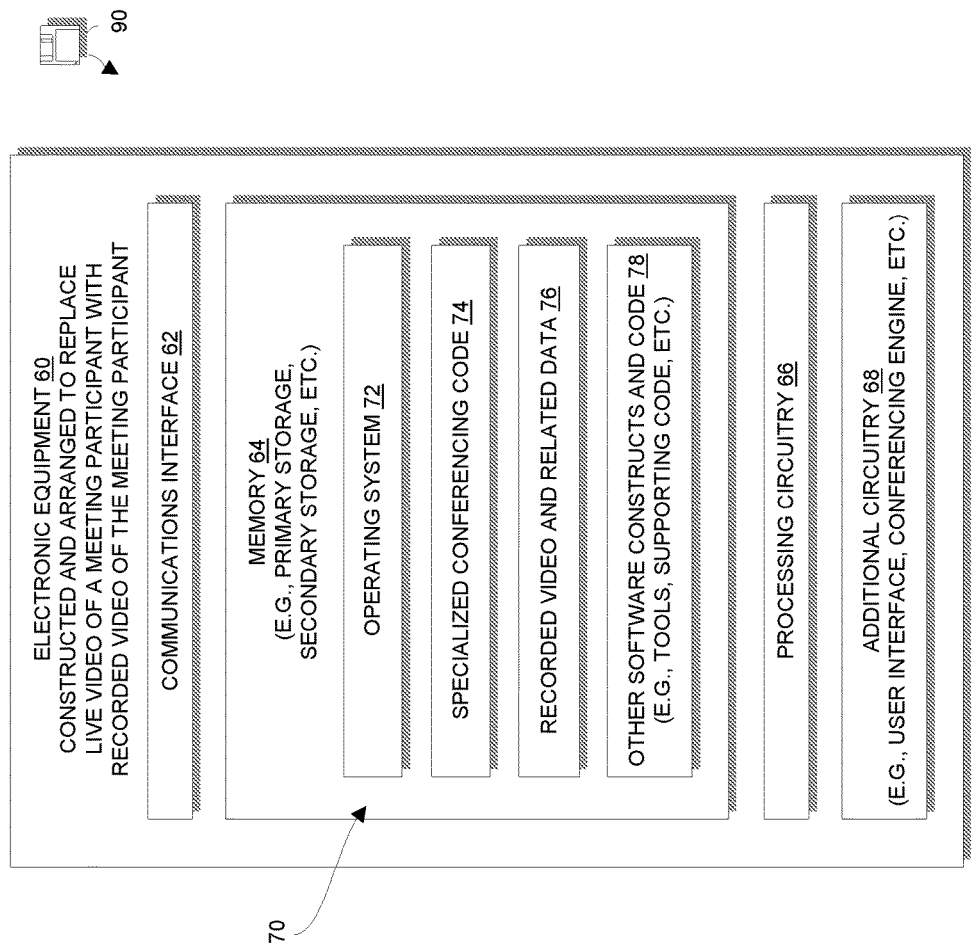
FIG. 2 is a block diagram of an electronic apparatus that is suitable for use in the computerized online collaboration setting of FIG. 1.

FIG. 2 shows particular details of electronic equipment 60 that is constructed and arranged to replace live video of a meeting participant with recorded video of the meeting participant during an online meeting. It should be understood that this electronic equipment 60 may form part of each client device 22, the conference server 24, or both (e.g., distributed circuitry). The electronic equipment 60 includes a communications interface 62, memory 64, and processing circuitry 66, and additional circuitry 68.

The communications interface 62 is constructed and arranged to connect the electronic equipment 60 to the communications medium 26 (FIG. 1) for copper-based and/or wireless communications (i.e., IP-based, cellular, etc.). In the context of a user workstation or general purpose computer, the communications interface 62 may take the form of a network interface card (NIC). In the context of a laptop or other mobile device, the communications interface 62 may take the form of a wireless transceiver. In the context of a larger scale platform (e.g., specialized equipment forming part of the conference server 34), the communications interface 62 may take the form of higher end networking circuitry that provides copper-based communications, wireless Ethernet communications, cellular communications, combinations thereof, and so on. Other networking technologies are available as well (e.g., fiber optic, Bluetooth, microwave and other RF communications, combinations thereof, etc.).

The memory 64 stores a variety of memory constructs 70 including an operating system 72, specialized conferencing code 74, one or more databases of recorded video and related data 76, and other software constructs and code 78 (e.g., tools, user applications, user profile data, status and support data, etc.). Although the memory 64 is illustrated as a single block in FIG. 2, the memory 64 is intended to represent both volatile and non-volatile storage (e.g., fast semiconductor memory, magnetic memory, etc.).

The processing circuitry 66 is configured to run in accordance with instructions of the various memory constructs 70 stored in the memory 64. Such operation enables the electronic equipment 60 to perform useful work. In particular, the processing circuitry 66 runs the operating system 72 to manage various computerized resources (e.g., processor cycles, memory allocation, etc.). Additionally, the processing circuitry 66 runs the specialized conferencing code 74 to operate as a client or a server in the context of electronic conferences such as online meetings and/or other types of electronic conferences.

The processing circuitry 66 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software to the electronic equipment 60 (e.g., also see the memory constructs 70 in FIG. 2). The computer program product 90 has a non-transitory (or non-volatile) computer readable medium which stores a set of instructions which controls one or more operations of the electronic equipment 60. Examples of suitable computer readable storage media include tangible articles of manufacture and apparatus which store instructions in a non-volatile manner such as CD-ROM, flash memory, disk memory, tape memory, and the like.

The additional circuitry 68 represents other circuitry of the electronic equipment 60. This other may depend on whether the electronic equipment 60 forms a portion of a client device 22 or the conference server 24 (also see FIG. 1).

For example, for a client device 22, the additional circuitry 68 represents user interface circuitry that is constructed and arranged to receive input from a user 30 and provide output to the user 30 (i.e., user I/O). Along these lines, in the context of a user workstation or a general purpose computer, the user interface may include a keyboard, a mouse/pointer, a microphone and a webcam for user input, and a monitor and a speaker for user output. In the context of a tablet or a similar mobile device, the user interface may include mobile phone components (e.g., a microphone and a speaker) and a touch screen. Other user input/output (I/O) technologies are available as well (e.g., a user headset, a hands-free peripheral, and so on).

On the other hand, for the conferencing server 24, the additional circuitry 68 represents conference engine circuitry that is constructed and arranged to manage and host electronic conferences. Along these lines, the conference engine circuitry may include specialized circuitry that manages user accounts, coordinates video feeds among different conferences that are occurring at the same time, performs specialized graphics processing, mixes audio feeds to provide aggregated audio to the conferences, and so on. Further details will now be provided with reference to FIGS. 3 through 6.

Figure 3:
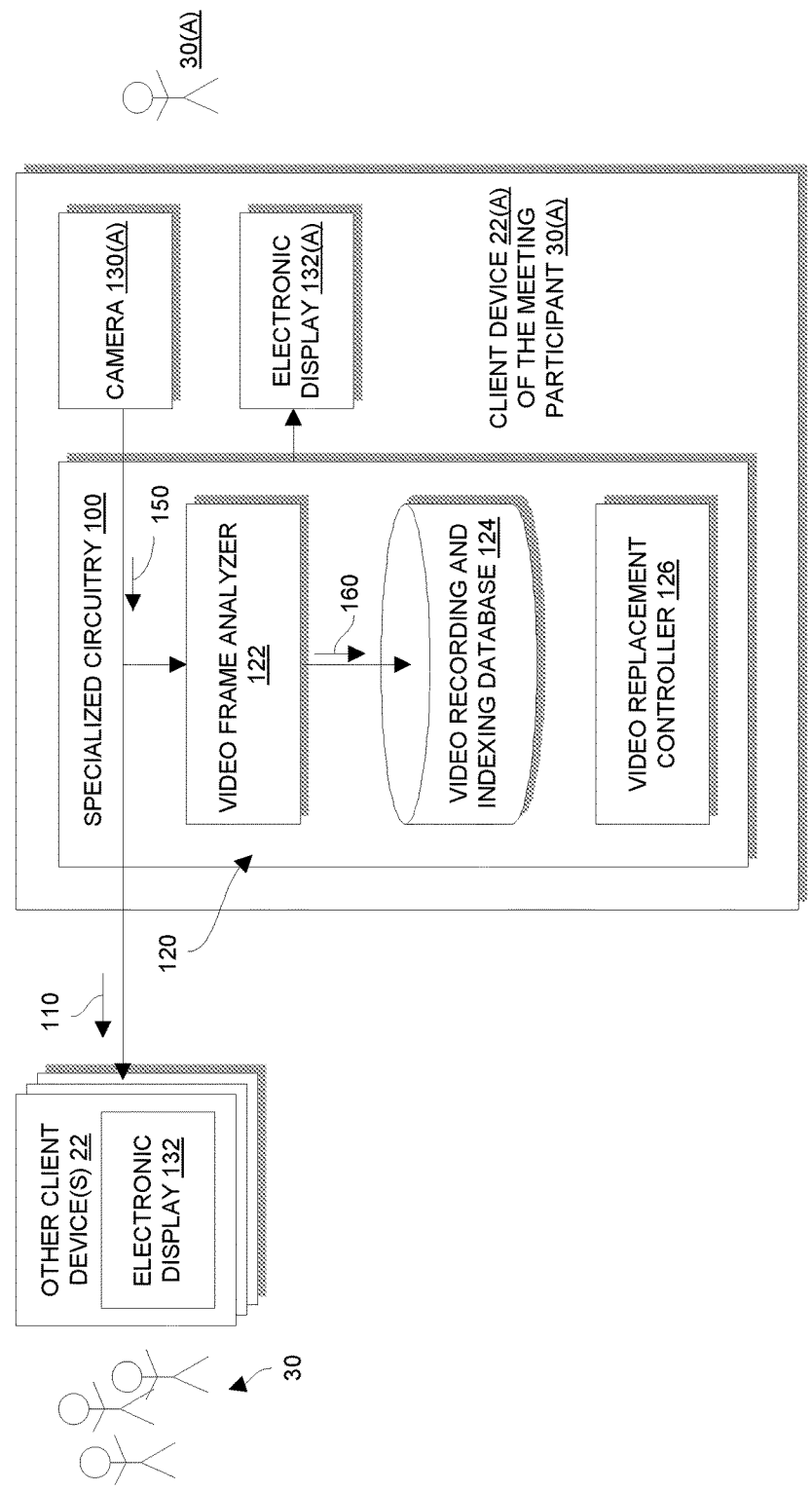
FIG. 3 is a block diagram illustrating particular details of the electronic apparatus of FIG. 1 during a first time.
Figure 4:
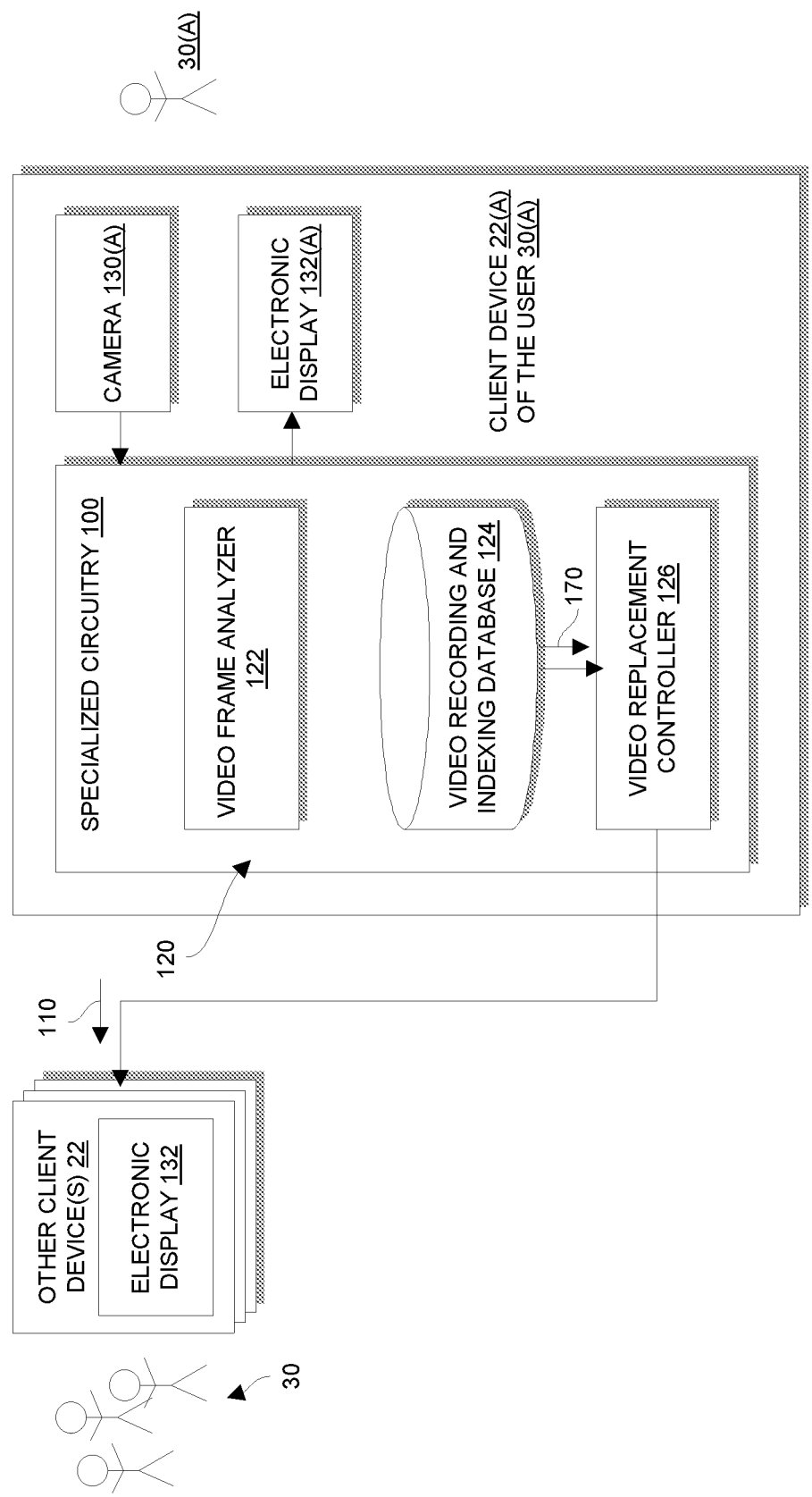
FIG. 4 is a block diagram illustrating particular details of the electronic apparatus of FIG. 1 during a second time.
Figure 5:
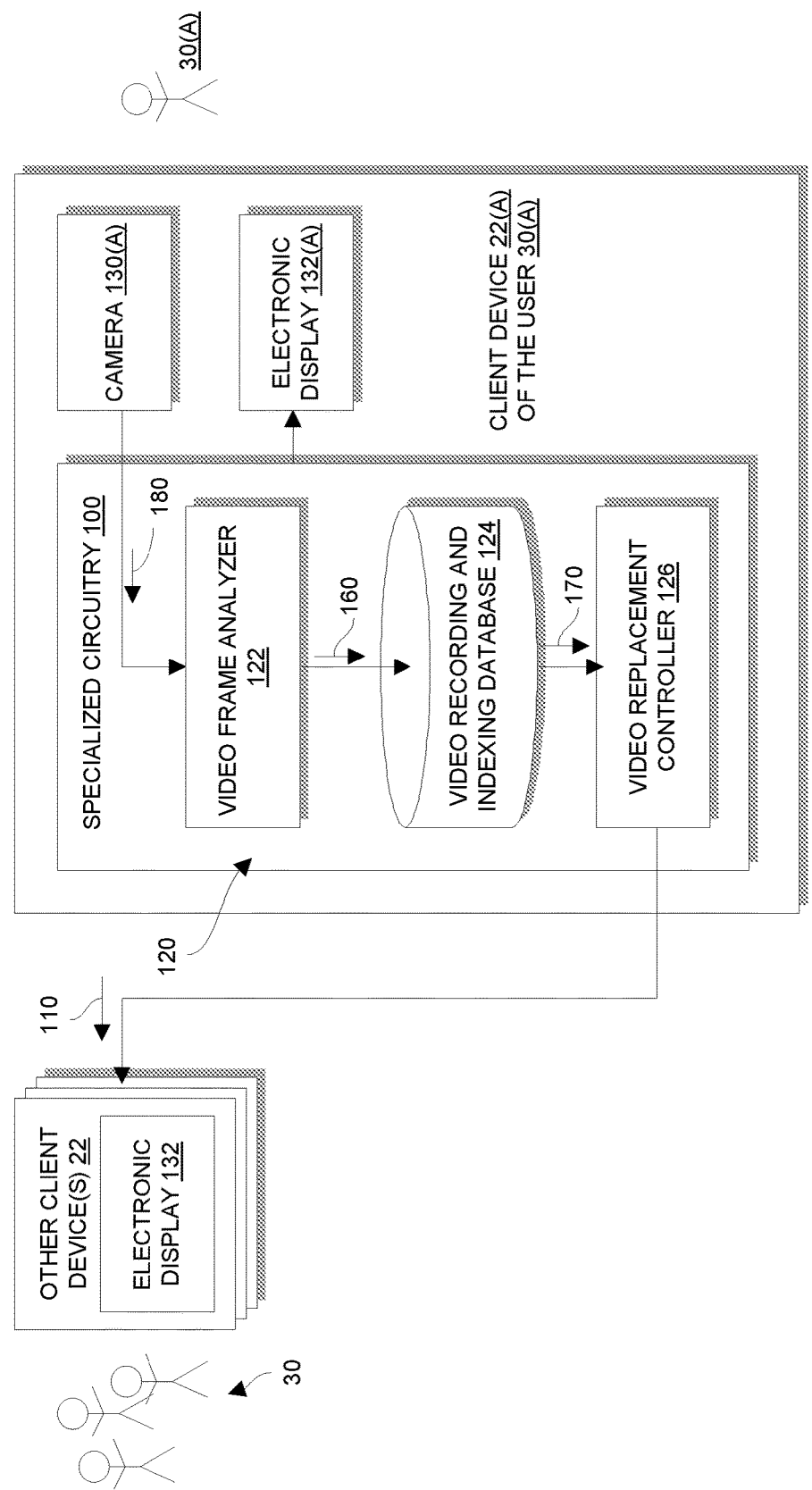
FIG. 5 is a block diagram illustrating particular details of the electronic apparatus of FIG. 1 during a third time.
Figure 6:
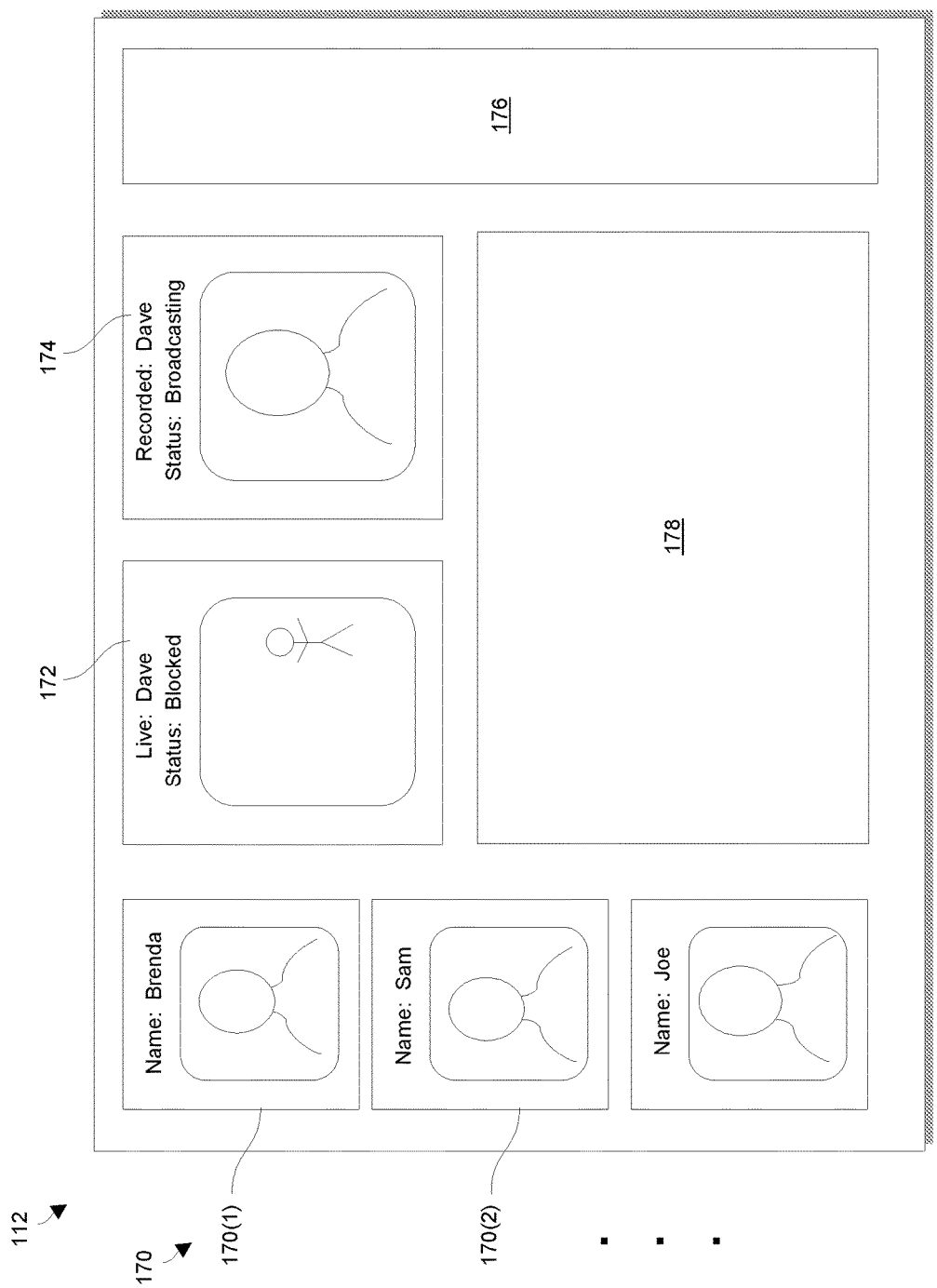
FIG. 6 is a block diagram illustrating particular details of a graphical user interface which is utilized by the meeting participant.

FIGS. 3 through 6 show particular example operating details of the computerized online collaboration setting 20 during operation. FIGS. 3 through 5 show how example specialized circuitry 100 of the computerized online collaboration setting 20 delivers video data 110 of a particular meeting participant 30(A) to other meeting participants 30. FIG. 6 shows an example graphical user interface (GUI) 112 that is operated by the meeting participant 30(A) to control delivery of the video data 110 to the other meeting participants 30.

It should be understood that the specialized circuitry 100 is formed by the processing circuitry 66 of the electronic equipment 60 operating in accordance with the memory constructs 70, e.g., the specialized conferencing code 74 (also see FIG. 2). As shown in FIGS. 3 through 5, the specialized circuitry 100 includes multiple components 120 such as a video frame analyzer 122, a video recording and indexing database 124, and a video replacement controller 126.

The specialized circuitry 100 is discussed below as residing in a client device 22(1) of the meeting participant 30(A) by way of example. Nevertheless, it should be understood that the specialized circuitry 100 may form part of the conference server 24, may be distributed among multiple client devices 22, may reside in specialized standalone circuitry, combinations thereof (i.e., distributed among the various components of the collaboration setting 20), and so on.

With the specialized circuitry 100 residing in the client device 22(1) of the meeting participant 30(A) as shown in FIGS. 3 through 5, various other meeting participants 30 use their respective client devices 22 to communicate with each other and with the meeting participant 30(A) during an online meeting. In particular, the client device 22(A) includes a camera 130(A) and an electronic display 132(A). The camera 130(A) enables the meeting participant 30(A) to capture video of the meeting participant 30(A) (e.g., the participant's moving face or profile) and share the captured video, as video data 110 of the meeting participant 30(A), during the online meeting. Additionally, the electronic display 132(A) enables the meeting participant 30(A) to concurrently view video of the other meeting participants 30 during the online meeting.

As shown in FIGS. 3 through 5, the other meeting participants 30 are able to view the video data 110 provided by the meeting participant 30(A) via electronic displays 132 of their respective client devices 22. Although the other meeting participants 30 are shown grouped together in FIGS. 3 through 5, it should be understood that the other meeting participants 30 may be remote/separated from each other, e.g., in different offices, physically located apart from each other by large geographical distances, etc. (also see FIG. 1).

As shown in FIG. 3, during an initial period of operation, the video data 110 of the meeting participant 30(A) that the other meeting participants 30 view is live video 150 of the meeting participant 30(A) which the camera 130(A) captures and outputs in real time. While the other meeting participants 30 view this real time live video 150 of the meeting participant 30(A) (e.g., showing physical/human movement of the participant 30(A)), the video frame analyzer 122 of the specialized circuitry 100 receives and processes the real time live video 150 in parallel. To this end, the video frame analyzer 122 makes a recording (or recorded video) 160 of the real time live video 150 and stores the recording 160 (i.e., a series of frames) in the video recording and indexing database 124.

It should be understood that, during this initial period of operation, the meeting participants 30 are able to view each other and converse with each other to perform useful work. In particular, each meeting participant 30 is able to operate a respective GUI 112 to view and control various aspects of the online meeting.

FIG. 6 shows an example GUI 112 which is provided to the meeting participant 30(A) via the electronic display 132(A) of the client device 22(A). As shown in FIG. 6, the GUI 112 includes a variety of windows or panes such as a set of other participant views 170(1), 170(2), . . . (collectively, other participant views 170) of the other participants 30 (i.e., moving video of each of the other meeting participants 30). Additionally, the GUI 112 includes a live view 172 of the meeting participant 30(A) (i.e., rendering of the real time live video 150 from the camera 130(A)), and a recorded view 174 of the meeting participant 30(A) (i.e., rendering of the recorded video 160 from the database 124). Furthermore, the GUI 112 includes other content such as a control panel 176 that the meeting participant 30(A) is able to operate (e.g., via depressing graphical buttons or prompts, moving sliders, pressing keyboard keys, etc.), a presentation screen 178 that renders content (e.g., a slideshow, a document, etc.) from a presenter (i.e., one of the meeting participants 30), and so on.

As shown in FIG. 6, the view 170 of each of the other meeting participants 30 displays a name of that other meeting participant 30 as well as moving video of that other meeting participant 30. The live view 172 of the meeting participant 30(A) shows what live video 150 the camera 130(A) of the client device 22(A) is currently capturing of the meeting participant 30(A) and the current status of that live video 150 (e.g., blocked, broadcasting, etc.). Similarly, the recorded view 174 of the meeting participant 30(A) shows the recorded video 160 that the specialized circuitry 100 is capturing and the current status of the recorded video 160 (e.g., blocked, broadcasting, etc.). It should be understood that the various locations of the windows/panels (or views) within the GUI 112, the window sizes, appearances, etc. are provided by way of example only and may be different in other arrangements as well as customized by the meeting participant 30(A).

At some point, the meeting participant 30(A) may decide to replace the live video 150 which is currently shared with the other meeting participants 30 (see the video data 110 in FIG. 3) with the recorded video 160. In particular, the meeting participant 30(A) may want to block the live video 150 without disrupting the online meeting (e.g., the meeting participant 30(A) may wish to get up and open a door, hide something in the background, etc.).

To block the other meeting participants 30 from seeing the live video 150, the meeting participant 30(A) enters a live video replacement command via the GUI 112 (FIG. 6). Along these lines, the meeting participant 30(A) may click a mouse while the mouse pointer is over a particular button (or a prompt or other type of graphic) on the control panel 176, type in a keyboard command, provide a user gesture into a touchscreen, etc. In response, the specialized circuitry 100 provides, as the video data 110, a portion of the recorded video 160 from the database 124 in place of the live video 150 from the camera 130(A).

It should be understood that the specialized circuitry 100 effectuates such video replacement seamlessly. To this end, the video frame analyzer 122 performs a first set of frame matching operations that matches frames from the live video 150 with frames of the recorded video 160 that are saved (or buffered) in the database 124. A variety of standard frame matching techniques are suitable for use such as those which compare pixels or sets of pixels and output a difference or score indicating how well or how poorly the frames match. Using such techniques, the video frame analyzer 122 deems frames as matching when the difference is below a predefined threshold. In some arrangements, the video frame analyzer 122 of the specialized circuitry 100 performs the first set of frame matching operations in an ongoing manner in the background (i.e., transparently to the meeting participant 30(A)). In other arrangements, the video frame analyzer 122 begins performing the first set of frame matching operations in response to receipt of the live video replacement command.

Additionally, the video frame analyzer 122 performs a second set of frame matching operations that matches frames from the recorded video 160 with each other in an attempt to form a video loop (or clip) 170 that is playable to the other meeting participants 30. Along these lines, the video frame analyzer 122 may find a portion of video of sufficient length that is terminated by frames which match within a predefined threshold (i.e., the pixel difference or score is below the predefined threshold). Again, in some arrangements, the video frame analyzer 122 of the specialized circuitry 100 performs the second set of frame matching operations in an ongoing manner in the background (i.e., transparently to the meeting participant 30(A)). In other arrangements, the video frame analyzer 122 begins performing the second set of frame matching operations in response to receipt of the live video replacement command.

It should be understood that the video frame analyzer 122 stores various frame indexes in the video recording and indexing database 124. Such indexes include where the portion of the recorded video 160 that forms the video loop starts and stops, which frame of the video loop currently matches a live video frame, and so on.

In response to the live video replacement command and once the video frame analyzer 122 (i) has found a frame of the live video 150 which matches a frame of the recorded video 160 and (ii) has matched frames within the recorded video 160 to form a video loop 170 of sufficient length that is replayable (e.g., more than 10 seconds of recorded video, more than 30 seconds of recorded video, etc.), the video frame analyzer 122 directs the video replacement controller 126 to replace, as the video data 110 provided to the other meeting participants 30, the real time live video 150 with the video loop 170, i.e., a portion of the recorded video 160.

It should be understood that the specialized circuitry 100 may artificially generate one or more frames of the video loop 170 (e.g., frames containing images of the meeting participant 30(A) that have never actually occurred). In some situations, the video frame analyzer 122 creates one or more frames from buffered frames. Such a frame may be based on an actual captured frame but include one or more modified regions (e.g., areas of modified pixels). In certain situations, the video frame analyzer 122 may even generate an entire frame. The video frame analyzer 122 then adds and/or replaces one or more frames within the series of frames forming the video loop 170 with one or more of the artificially generated frames (e.g., saves the artificially generated frames in the database 124, updates indexes, etc.). Such operation enables the specialized circuitry 100 to provide appropriate content even when the specialized circuitry 100 is unable to obtain sufficient video from actual captured frames.

In some arrangements, in order to generate a natural and convincing video loop, instead of simply repeating certain part of the recorded video, the video frame analyzer 122 finds potential transition points in the recorded video, divides the recorded video into different clips, and synthesizes new video (e.g., by rearranging and reusing these analyzed clips). Along these lines, the transition points may be frames that are similar to each other, so that transition between these frames is not noticeable. Then, based on these transition points, short analyzed video clips is extracted from the recorded video clip as reusable resources. Later these video clips are stitched together in random order so that the synthesized video can be playing endlessly without noticeable repetition.

For example, the specialized circuitry 100 may determine that frame #100 is similar to frame #200, while frame #120 is similar to frame #170. When the video is playing at frame #100, the specialized circuitry 100 can choose to stitch frame #200 after frame #100, or keep playing the current video until frame #120 and continue with frame #170. With these extra combinations, the specialized circuitry 100 is able to keep playing the video endlessly with far more variation rather than simply repeating one single video loop.

FIG. 4 shows the live video 150 replaced with the video loop 170. That is, in response to the live video replacement command, the video replacement controller 126 now plays the video loop 170 starting at the frame of the recorded video 160 that matches the current frame of real time live video 150. The video replacement controller 126 can continue playing the video loop 170 repetitively (i.e., over and over again) for an indefinite amount of time. Accordingly, the other meeting participants 30 can continue to participate in the online meeting without any distraction from replacing the live video 150 with the video loop 170 derived from the recorded video 160.

It should be understood that during the above-described video replacement process, the specialized circuitry 100 updates visual data within the GUI 112 (FIG. 6). In particular, once the specialized circuitry 100 has replaced the live video 150 with the video loop 170, the specialized circuitry 100 updates the GUI 112. In particular, the specialized circuitry 100 updates the status in the live view 172 (e.g., from broadcasting to blocked) and updates the status in the recorded view 174 (e.g., from blocked to broadcasting) so that the meeting participant 30(A) knows that the other meeting participants 30 can no longer view the meeting participant 30(A) in real time. As a result, the meeting participant 30(A) has successfully blocked the live video 150 without disrupting the online meeting.

It should be further understood that the meeting participant 30(A) may need to wait before the live video 150 is successfully replaced with the recorded video 160. For example, early in the online meeting, the video frame analyzer 122 of the specialized circuitry 100 may not have yet buffered enough recorded video 160 or it may be some time before matching frames are found within the recorded video 160 to successfully form a video loop 170. As another example, the video frame analyzer 122 may not have yet found matching frames between the live video 150 and the recorded video 160 to provide a smooth (or seamless) transition. During such waiting time, the GUI 112 may output a notice to the meeting participant 30(A) that the replacement operation has not yet completed and the other participants 30 are still receiving live video 150 of the meeting participant 30(A).

It should be understood that the meeting participant 30(A) may continue to talk with the other meeting participants 30 while the recorded video 160 is being played in place of the live video 150. Along these lines, the meeting participant 30(A) may be wearing a wireless headset, hand carrying a smartphone, and so on.

Eventually, the meeting participant 30(A) may decide to switch back to live video 150. Here, the meeting participant 30(A) enters a live video restore command via the GUI 112 (e.g., activates a prompt or button). In response, the video frame analyzer 122 compares new frames of the live video 150 output by the camera 130(A) with frames of the video loop 170 that the video replacement controller 126 is currently playing to the other meeting participants 30. When the video frame analyzer 122 finds a match (e.g., a difference or score that is below a predefined threshold), the video frame analyzer 122 directs the video replacement controller 126 to stop playing the video loop 170 and to switch back to playing new live video 180 to the other meeting participants 30. Again, since the frames of the new live video 180 and the video loop 170 match, the transition from the video loop 170 to the new live video 180 is seamless and does not distract from the online meeting.

It should be understood that the various above-mentioned predefined thresholds that are used to match frames for different purposes may be the same or different from each other (e.g., the threshold for switching back from recorded video may be more forgiving that the threshold for switching from live video). Along these lines, it may be difficult for the video frame analyzer 122 to find suitable or well-matching frames when attempting to replace the video loop 170 with new live video 180. In some arrangements, the specialized circuitry 100 may inform the meeting participant 30(A) that the meeting participant 30(A) needs to wait in order to find a better match, or that the meeting participant 30(A) should move to provide a better match.

However, in some situations, it may be difficult or impossible for the specialized circuitry 100 to find a match within a predefined threshold (e.g., the meeting participant 30(A) may have moved the camera 130(A) to capture a different background, meeting participant 30(A) may have put on glasses, etc.). For situations in which the specialized circuitry 100 cannot find a suitable match within a predefined amount of time (e.g., 15 seconds, 30 seconds, etc.), the specialized circuitry 100 may provide a comfortable visual transition effect to switch between videos (e.g., a short blur, blending of pixel values, etc.). Alternatively, the specialized circuitry 100 may provide a somewhat conspicuous transition (e.g., a noticeable flash, an effect that is somewhat jarring, etc.) in order to disguise the switch between live and recorded video.

It should be understood that the meeting participant 30(A) may repeat the above-described process of replacing live video with recorded video and replacing recorded video with live video multiple times. During these situations, the online meeting continues uninterrupted and without distractions. Further details will now be provided with reference to FIG. 7.

Figure 7:
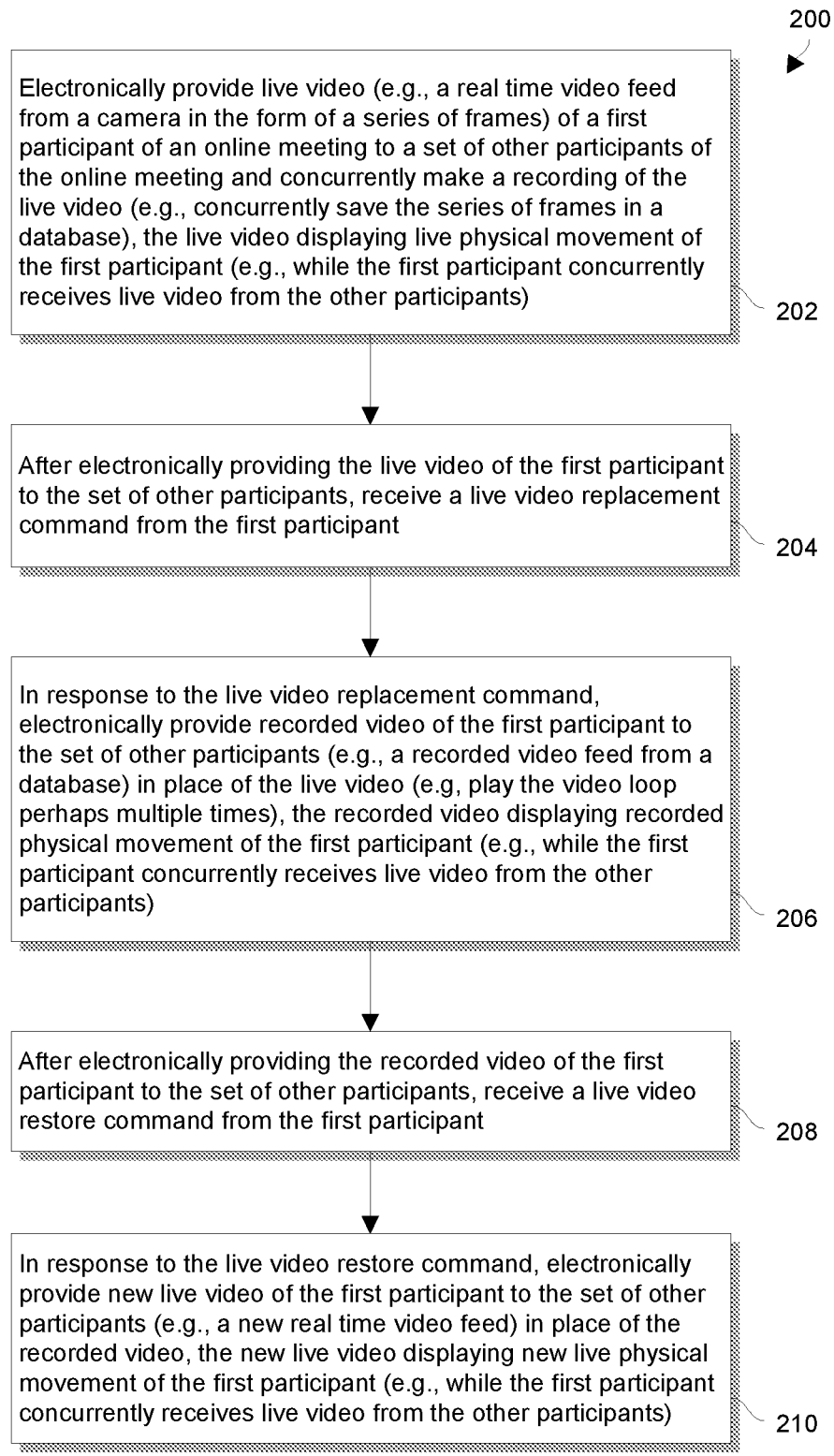
FIG. 7 is a flowchart of a procedure that is performed by the computerized online collaboration setting of FIG. 1.

FIG. 7 is a flowchart of a procedure 200 that is performed by the specialized circuitry 100 during an online meeting.

At 202, the specialized circuitry 100 electronically provides live video of a first participant of the online meeting to a set of other participants of the online meeting. The live video displays live physical movement of the first participant. During this time, the first participant may receive and view live video from the set of other participants.

At 204, after electronically providing the live video of the first participant to the set of other participants, the specialized circuitry 100 receives a live video replacement command from the first participant.

At 206, in response to the live video replacement command, the specialized circuitry 100 electronically provides recorded video of the first participant to the set of other participants in place of the live video. The recorded video displays recorded physical movement of the first participant. During this time, the first participant may continue to receive and view live video from the set of other participants.

At 208, after electronically providing the recorded video of the first participant to the set of other participants, the specialized circuitry 100 receives a live video restore command from the first participant.

At 210, in response to the live video restore command, the specialized circuitry 100 electronically provides new live video of the first participant of the online meeting to the set of other participants of the online meeting in place of the recorded video, the new live video displaying new live physical movement of the first participant. During this time, the first participant may continue to receive and view live video from the set of other participants.

As described above, improved techniques are directed to replacing live video 150 of a meeting participant 30 with a portion of recorded video 160 of the meeting participant 30 during an online meeting. While the recorded video 160 (e.g., a video clip 170) is playing in place of the live video 150, the other meeting participants 30 view the recorded video 160 rather than the live video 150. During this time, the meeting participant 30 may address particular situations such as wait for a family member to exit the background, get up and open a door, etc. When the meeting participant 30 is ready to share live video 150 again, the recorded video 160 of the meeting participant is replaced with new live video 180 of the meeting participant 30. These transitions from live video to recorded video and back may occur seamlessly without distracting the other meeting participants 30.

Additionally, one should appreciate that this above-described techniques amount to more than simply providing video to viewers. Rather, the techniques involve an improvement to the technology by providing an advanced process for seamlessly transitioning between live and recorded video of a meeting participant so as not to disrupt the online meeting. Such operation results in less distraction that could otherwise make the online meeting less efficient and perhaps even side track the discussion.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the conference server 24 (FIG. 1) are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, cellular-based communications, combinations thereof, and so on.

Additionally, it should be understood that the above-described equipment provides video conference attendees with the option to replace their outbound video stream with a generated video stream. This "active pausing" affords attendees with a period of privacy during the conference, without calling attention to their change in state.

Unfortunately, conventional solutions for pausing video provide a static frame when a user pauses her video, whereas the above-described improved equipment provides an artificial, moving video stream, which allows the attendee to disguise the fact that the live video is paused. As such, the above-described improved equipment provides user experiences tailored specifically to entering the active pause state, exiting the pause state, and provisioning the equipment with enough footage to generate a "pause" video.

It should be understood that video conference meetings may be more engaging if the attendees consistently show their video webcam feed during the meeting. In fact, certain research shows that salespeople who shared their webcam showed a 34% increase in close rate over those who did not. With this in mind, many professionals who wish to increase the value of meetings that they hold will insist that all attendees actively share their webcams whenever attending a video conference.

As a consequence, many people who are working remotely in a public space (e.g., café) or from home will be sharing video of spaces that can sometimes become distracting from the topic of discussion (e.g. a server in the café walks past) or even video that is of a private nature (e.g. a family member wearing pajamas becomes visible). Meeting software provides attendees with the ability to pause their video stream whenever they wish, which at this point looks like a static image (e.g. text that says "Video paused") or simply a blank video feed. When this happens, the transition from a color, full motion video stream to a black frame can cause the other meeting attendees to take notice of the pausing attendee, distracting their attention from the meeting's topic, sometimes drawing remarks about the pause event itself, which can derail the entire conversation.

This focus of attention is completely undesired by the user who pauses her/his video, especially when she/he is not actively talking but is still able to passively participate by listening in on the current conversation. For example, the user may need to stand up from her/his desk to fetch a notepad, but since she/he is wearing a wireless headset she/he can listen attentively.

The improved "active pausing" equipment solves the problem of distraction and undue attention during a pause event by presenting the illusion of the video sequence continuing as before. Instead of calling attention to the pause by showing a blank video stream or static image, the equipment generates a video "loop" of the current video feed so that it appears as though the attendee is passively continuing their behavior as before. This way, other attendees will focus their attention on the topics at hand, and will not even notice their colleague's absence.

In an example use case, suppose that Shirley is attending a video conference meeting with her team of six people for their weekly sync-up. She is working from home today, and is seated at her kitchen table for the meeting. She is dialed into the meeting with her laptop, and she is using a wireless headset mic for audio.

At some point, the team begins going around the table for their updates, and eventually two of her colleagues begin debating the best way for their project to move forward. The discussion is not specifically relevant to Shirley, but she wishes to keep up-to-date with her colleagues' statuses, so she pays attention, listening passively with her microphone muted. During this conversation, she notices that the electrician is pulling into the driveway as scheduled. She knows that she will need to let him in the door, but she doesn't wish to seem rude by getting up and walking out of frame or by turning off her video stream. Instead, she initiates the above-described "Active Pause" feature.

Upon activation, the Active Pause feature presents Shirley with a prompt that her video will now be replaced with a generated video stream. The equipment then ensures that it has sufficient footage recorded to generate this video stream, and then transitions the broadcasted video stream from the live webcam view to a generated video stream. Once the transition has occurred, Shirley is alerted that her video is now replaced. Shirley now stands up from her table, lets the electrician into her home, and directs him to his task. The conversation between her colleagues continues while her software streams the generated video.

From some perspectives, the generated video can be roughly described as a "loop" of what Shirley was doing before she left. More precisely, video frames are analyzed, and regions with periodic behavior are extracted for later use. For example, the analysis might show that the region around Shirley's eyes exhibit periodic motion every three seconds, while her mouth region can be looped at 10 seconds. These periodic samples are then able to be pieced together and interleaved to generate the replacement video "loop."

When she comes back to the table, she situates herself roughly where she was sitting before, and she chooses to dismiss the pause state. The GUI instructs her to try to match the recorded video. At the same time, the generated video stream advances to mimic the live video stream of Shirley. Once the equipment determines the match is sufficient, the outbound video stream is transitioned from the generated video to the live webcam video, and Shirley is alerted that she is now un-paused.

It should be understood that the equipment will be monitoring the video stream as long as the webcam has been shared in order to build a database of motion samples that it can piece together to generate the video stream. If the equipment determines that it does not have sufficient samples, it can ask the user to record a short sample before activating the pause. This could be the case if the Shirley wishes to pause very soon after first sharing her camera. Otherwise, if the equipment has the footage it needs, the equipment will then transition to the placeholder video as quickly as possible.

The equipment uses various visual similarity metrics to determine when the video can be transitioned from the generated video to the live video, or vice versa. If it is difficult or impossible to generate a seamless boundary between videos, then the equipment can leverage various means to disguise the transition. For example, limitations of the human visual perception system lead users be blind to even dramatic changes when the image flickers on and off. For another example, the transition may be disguised as a video encoding error by simulating a missed keyframe, or as a drop in bandwidth by dropping the resolution briefly.

While Shirley's webcam is active, the live video frames are passing through the video frame analysis circuitry. Video frame analysis keeps a rolling window analysis of the video stream, comparing each video frame against other frames, preconfigured image templates, etc. to generate signature video loop samples. These samples are sub-regions of video (patches of pixels) which are tagged with their periodic qualities (e.g. at what interval they can loop, which other video loop samples they can be combined with, etc.). The loop samples are then stored in a video loop index database for later reference.

When Shirley starts the active pause mode, the equipment tells her that it is transitioning to a generated placeholder video. During this process, the video loop generator retrieves previously-stored video loop samples from the loop index as well as live video loop samples directly from the analysis component. The transition disguise component now compares the live video stream with the generated placeholder video to find two simultaneous frames which are similar enough to switch from the live video to the placeholder. When a match is found, the live video is transitioned to the generated placeholder video.

Once the outbound video stream is replaced by the placeholder video, the Video Loop Generator draws loop samples form the video loop index database and builds a moving video, which is a composite of the various loop samples. Since the different loop samples may have different looping intervals (e.g. the mouth region loops over three seconds while the eyes loop over five seconds) then they must be selected, transformed, and composited together into the final frame output. If no matching frame is found within a certain time threshold, a transition effect may be inserted.

When Shirley chooses to end the active pause mode, the equipment attempts to synchronize the outbound placeholder video with the live video stream captured by her webcam. Much like when activating the pause mode the loop generator tries to match the placeholder video frames with the live video frames.

If the transition disguise component cannot find a suitable crossover frame within an appropriate amount of time, transition disguise will force the transition to happen immediately, but will alter the video feed briefly to hide the obvious transition. For example, the video could be blurred to simulate the camera losing focus, or the image could be washed out to simulate an error with the camera's auto-exposure compensation.

While the description above references video loop samples as being sub-regions of the video stream, a simple implementation could use entire frames for the loop to ensure coherency of each image. In this case, the generated loop placeholder would be a segment of video captured from the actual video stream. Care may be taken to smooth the transition from the end back to the start of the loop, for example, by adding a smooth fade, or even certain geometric transforms to make the last frame look more like the first.

Other features to Active Pausing are ways to automatically invoke the pausing. In the example above, the family member walking by in pajamas could be detected and filtered out by invoking the looped video without prompting.

It should be understood that the equipment operates on live video, and as such the equipment may be continually monitoring the scene for loops that exist so that it can switch to a placeholder video at any arbitrary time the user chooses. Existing video textures take in pre-recorded video, which processed in batch to detect possible loop frames.

It should be further understood that there are user interaction considerations that may extend from the raw technical capabilities of the equipment. For example, if a seamless transition point cannot be found from the live video and the generated placeholder, instead of simply failing the equipment may proceed with the pausing action anyway, and do its best to disguise the transition.

Additionally, it should be understood that various modifications can be made to the algorithmic and user interaction considerations for how to guide a person into and out of the active pause state. The user could be prompted to try to match the generated video stream at the same time that the equipment manipulates the video to try and match the user's current pose closely enough that a transition can occur. Such modifications and enhancements are intended to belong to various embodiments of the disclosure.

What is claimed is:

1. A method of conducting an online meeting, the method comprising:
   electronically providing, by processing circuitry, live video of a first participant of the online meeting to a set of other participants of the online meeting, the live video displaying live physical movement of the first participant;
   after electronically providing the live video of the first participant of the online meeting to the set of other participants of the online meeting, receiving, by the processing circuitry, a live video replacement command from the first participant;
   in response to the live video replacement command, electronically providing, by the processing circuitry, recorded video of the first participant of the online meeting to the set of other participants of the online meeting in place of the live video, the recorded video displaying recorded physical movement of the first participant;
   after electronically providing the recorded video of the first participant of the online meeting to the set of other participants of the online meeting, receiving, by the processing circuitry, a live video restore command from the first participant;
   in response to the live video restore command, electronically providing, by the processing circuitry, new live video of the first participant of the online meeting to the set of other participants of the online meeting in place of the recorded video, the new live video displaying new live physical movement of the first participant;
   while the live video of the first participant is provided to the set of other participants, providing live video of the set of other participants to the first participant;
   while the recorded video of the first participant is provided to the set of other participants, providing live video of the set of other participants to the first participant; and
   while the new live video of the first participant is provided to the set of other participants, providing live video of the set of other participants to the first participant;
   wherein electronically providing the live video of the first participant to the set of other participants of the online meeting includes:
      conveying a real time video feed of the first participant from a camera to the set of other participants of the online meeting;
   wherein electronically providing the recorded video of the first participant to the set of other participants of the online meeting includes:
      conveying a recorded video feed of the first participant from computerized memory to the set of other participants of the online meeting, the recorded video feed being different from the real time video feed; and
   wherein electronically providing the new live video of the first participant to the set of other participants of the online meeting includes:
      conveying a new real time video feed of the first participant from the camera to the set of other participants of the online meeting, the new real time video feed being different from the recorded video feed;

wherein the recorded video of the first participant includes artificially generated video having video portions which are stitched together in a random order; and wherein electronically providing the recorded video of the first participant of the online meeting to the set of other participants further includes:
playing the artificially generated video to the set of other participants.

2. A method as in claim 1 further comprising:
while conveying the real time video feed of the first participant from the camera to the set of other participants of the online meeting, making a recording of at least a portion of the real time video feed of the first participant in the computerized memory.

3. A method as in claim 2 wherein the recording of the real time video feed includes a recorded series of frames; and
wherein conveying the recorded video feed of the first participant from computerized memory to the set of other participants includes playing at least some of the recorded series of frames to the set of other participants.

4. A method as in claim 3 wherein the recorded series of frames includes a video clip; and
wherein playing at least some of the recorded series of frames to the set of other participants includes:
playing the video clip to the set of other participants multiple times as a video loop.

5. A method as in claim 4, further comprising:
performing a set of frame matching operations that matches frames among the recorded series of frames, the set of frame matching operations identifying a beginning frame of the video clip and an ending frame of the video clip, the beginning frame matching the ending frame within a predefined frame matching threshold.

6. A method as in claim 4, further comprising:
in response to the live video replacement command and prior to conveying the recorded video feed of the first participant from computerized memory to the set of other participants of the online meeting, performing a set of frame matching operations that matches frames between (i) frames of the real time video feed of the first participant and (ii) the recorded series of frames, the set of frame matching operations identifying a transition from the real time video feed to the recorded video feed in response to matching a current frame of the real time video feed of the first participant and a particular frame of recorded series of frames within a predefined frame matching threshold.

7. A method as in claim 4, further comprising:
in response to the live video restore command and prior to conveying the new real time video feed of the first participant from the camera to the set of other participants of the online meeting, performing a set of frame matching operations that matches frames between (i) the recorded series of frames and (ii) frames of the new real time video feed of the first participant, the set of frame matching operations identifying a transition from the recorded video feed to the new real time video feed in response to matching a particular frame of recorded series of frames and a current frame of the new real time video feed of the first participant within a predefined frame matching threshold.

8. A method of conducting an online meeting, the method comprising:
electronically providing, by processing circuitry, live video of a first participant of the online meeting to a set of other participants of the online meeting, the live video displaying live physical movement of the first participant;

after electronically providing the live video of the first participant of the online meeting to the set of other participants of the online meeting, receiving, by the processing circuitry, a live video replacement command from the first participant;

in response to the live video replacement command, electronically providing, by the processing circuitry, recorded video of the first participant of the online meeting to the set of other participants of the online meeting in place of the live video, the recorded video displaying recorded physical movement of the first participant;

after electronically providing the recorded video of the first participant of the online meeting to the set of other participants of the online meeting, receiving, by the processing circuitry, a live video restore command from the first participant;

in response to the live video restore command, electronically providing, by the processing circuitry, new live video of the first participant of the online meeting to the set of other participants of the online meeting in place of the recorded video, the new live video displaying new live physical movement of the first participant;

while the live video of the first participant is provided to the set of other participants, providing live video of the set of other participants to the first participant;

while the recorded video of the first participant is provided to the set of other participants, providing live video of the set of other participants to the first participant; and while the new live video of the first participant is provided to the set of other participants, providing live video of the set of other participants to the first participant;

wherein electronically providing the live video of the first participant to the set of other participants of the online meeting includes:
conveying a real time video feed of the first participant from a camera to the set of other participants of the online meeting;

wherein electronically providing the recorded video of the first participant to the set of other participants of the online meeting includes:
conveying a recorded video feed of the first participant from computerized memory to the set of other participants of the online meeting, the recorded video feed being different from the real time video feed; and wherein electronically providing the new live video of the first participant to the set of other participants of the online meeting includes:
conveying a new real time video feed of the first participant from the camera to the set of other participants of the online meeting, the new real time video feed being different from the recorded video feed;

wherein electronically providing the recorded video of the first participant to the set of other participants of the online meeting further includes:
while conveying the real time video feed of the first participant from the camera to the set of other participants of the online meeting, making a recording of at least a portion of the real time video feed of the first participant in the computerized memory;

wherein the recording of the real time video feed includes a recorded series of frames; and wherein conveying the recorded video feed of the first participant from computerized memory to the set of other participants includes playing at least some of the recorded series of frames to the set of other participants; and wherein the recorded series of frames includes artificially generated video having video portions which are stitched together in a random order; and wherein playing at least some of the recorded series of frames to the set of other participants includes:
  playing the artificially generated video to the set of other participants.

9. A method as in claim 8, further comprising:
while conveying the real time video feed of the first participant from the camera to the set of other participants of the online meeting, rendering the real time video feed of the first participant on an electronic display to the first participant.

10. A method as in claim 9, further comprising:
while conveying the real time video feed of the first participant from the camera to the set of other participants of the online meeting, further rendering a live video replacement command prompt on the electronic display to the first participant, the first participant actuating the live video replacement command prompt to provide the live video replacement command to the processing circuitry.

11. A method as in claim 10, further comprising:
while conveying the recorded video feed of the first participant from the computerized memory to the set of other participants of the online meeting, rendering the recorded video feed of the first participant on the electronic display to the first participant.

12. A method as in claim 11, further comprising:
while conveying the recorded video feed of the first participant from the computerized memory to the set of other participants of the online meeting, further rendering a live video restore command prompt on the electronic display to the first participant, the first participant actuating the live video restore command prompt to provide the live video restore command to the processing circuitry.

13. A method as in claim 10, further comprising:
after the live video replacement command prompt is actuated and before the recorded video feed of the first participant is conveyed from the computerized memory to the set of other participants of the online meeting, displaying a warning notification on the electronic display to the first participant, the warning notification indicating that the real time video feed of the first participant is currently being conveyed from the camera to the set of other participants of the online meeting.

14. A method as in claim 10, further comprising:
after the live video restore command prompt is actuated and before the new real time video feed of the first participant is conveyed from the computerized memory to the set of other participants of the online meeting, generating a visual effect between the recorded video feed and the new real time video feed to provide a controlled transition between the recorded video feed and the new real time video feed.

15. A method as in claim 1, further comprising:
prior to providing the recorded video in place of the live video, (i) selecting a set of image portions from actual captured video containing period motion of the first participant, (ii) extracting the selected set of image portions from the actual captured video, and (iii) incorporating the selected set of image portions within a set of artificially generated frames and integrating the set of artificially generated frames into the recorded video.

16. A computer program product having a non-transitory computer readable medium that stores a set of instructions to conduct an online meeting; the set of instructions, when carried out by computerized circuitry, causing the computerized circuitry to perform a method of:
  electronically providing live video of a first participant of the online meeting to a set of other participants of the online meeting, the live video displaying live physical movement of the first participant;
  after electronically providing the live video of the first participant of the online meeting to the set of other participants of the online meeting, receiving a live video replacement command from the first participant; and
  in response to the live video replacement command, electronically providing recorded video of the first participant of the online meeting to the set of other participants of the online meeting in place of the live video, the recorded video displaying recorded physical movement of the first participant;
  after electronically providing the recorded video of the first participant of the online meeting to the set of other participants of the online meeting, receiving a live video restore command from the first participant;
  in response to the live video restore command, electronically providing new live video of the first participant of the online meeting to the set of other participants of the online meeting in place of the recorded video, the new live video displaying new live physical movement of the first participant;
  while the live video of the first participant is provided to the set of other participants, providing live video of the set of other participants to the first participant;
  while the recorded video of the first participant is provided to the set of other participants, providing live video of the set of other participants to the first participant; and
  while the new live video of the first participant is provided to the set of other participants, providing live video of the set of other participants to the first participant;
wherein electronically providing the live video of the first participant to the set of other participants of the online meeting includes:
  conveying a real time video feed of the first participant from a camera to the set of other participants of the online meeting;
wherein electronically providing the recorded video of the first participant to the set of other participants of the online meeting includes:
  conveying a recorded video feed of the first participant from computerized memory to the set of other participants of the online meeting, the recorded video feed being different from the real time video feed; and
wherein electronically providing the new live video of the first participant to the set of other participants of the online meeting includes:
  conveying a new real time video feed of the first participant from the camera to the set of other participants of the online meeting, the new real time video feed being different from the recorded video feed;
wherein the recorded video of the first participant includes artificially generated video having video portions which are stitched together in a random order; and wherein electronically providing the recorded video of the first participant of the online meeting to the set of other participants further includes:
 playing the artificially generated video to the set of other participants.

17. An electronic apparatus, comprising:
 an electronic display;
 memory; and
 control circuitry coupled to the electronic display and the memory, the memory storing instructions that, when carried out by the control circuitry, cause the control circuitry to:
  electronically provide live video of a first participant of the online meeting to a set of other participants of the online meeting, the live video displaying live physical movement of the first participant;
  after electronically providing the live video of the first participant of the online meeting to the set of other participants of the online meeting, receive a live video replacement command from the first participant; and
  in response to the live video replacement command, electronically provide recorded video of the first participant of the online meeting to the set of other participants of the online meeting in place of the live video, the recorded video displaying recorded physical movement of the first participant;
  after electronically providing the recorded video of the first participant of the online meeting to the set of other participants of the online meeting, receive a live video restore command from the first participant;
  in response to the live video restore command, electronically provide new live video of the first participant of the online meeting to the set of other participants of the online meeting in place of the recorded video, the new live video displaying new live physical movement of the first participant;
  while the live video of the first participant is provided to the set of other participants, provide live video of the set of other participants to the first participant;
  while the recorded video of the first participant is provided to the set of other participants, provide live video of the set of other participants to the first participant; and
  while the new live video of the first participant is provided to the set of other participants, provide live video of the set of other participants to the first participant;
 wherein the control circuitry, when electronically providing the live video of the first participant to the set of other participants of the online meeting, is constructed and arranged to:
  convey a real time video feed of the first participant from a camera to the set of other participants of the online meeting;
 wherein the control circuitry, when electronically providing the recorded video of the first participant to the set of other participants of the online meeting, is constructed and arranged to:
  convey a recorded video feed of the first participant from computerized memory to the set of other participants of the online meeting, the recorded video feed being different from the real time video feed; and wherein the control circuitry, when electronically providing the new live video of the first participant to the set of other participants of the online meeting, is constructed and arranged to:
  convey a new real time video feed of the first participant from the camera to the set of other participants of the online meeting, the new real time video feed being different from the recorded video feed;
 wherein the recorded video of the first participant includes artificially generated video having video portions which are stitched together in a random order; and
 wherein the control circuitry, when electronically providing the recorded video of the first participant of the online meeting to the set of other participants, is further constructed and arranged to:
  play the artificially generated video to the set of other participants.

18. A method as in claim 1, further comprising:
 from image portions of actual captured video of the first participant, creating, as a series of artificially generated frames, a sequence of frames depicting eye movement and lip movement of the first participant.

19. A method as in claim 18 wherein creating the sequence of frames depicting eye movement and lip movement of the first participant includes:
 joining together at least some of the image portions of the actual captured video of the first participant to dynamically generate a first frame of the sequence of frames, the first frame containing a first image of the first participant that never actually occurred, and
 joining together at least some of the image portions of the actual captured video of the first participant to dynamically generate a second frame of the sequence of frames, the second frame containing a second image of the first participant that never actually occurred, the second image being different from the first image.

20. A computer program product as in claim 16 wherein the method further comprises:
 from image portions of actual captured video of the first participant, creating, as a series of artificially generated frames, a sequence of frames depicting eye movement and lip movement of the first participant.

21. A computer program product as in claim 20 wherein creating the sequence of frames depicting eye movement and lip movement of the first participant includes:
 joining together at least some of the image portions of the actual captured video of the first participant to dynamically generate a first frame of the sequence of frames, the first frame containing a first image of the first participant that never actually occurred, and
 joining together at least some of the image portions of the actual captured video of the first participant to dynamically generate a second frame of the sequence of frames, the second frame containing a second image of the first participant that never actually occurred, the second image being different from the first image.

22. An electronic apparatus as in claim 17 wherein the control circuitry is further constructed and arranged to:
 from image portions of actual captured video of the first participant, create, as a series of artificially generated frames, a sequence of frames depicting eye movement and lip movement of the first participant.

23. An electronic apparatus as in claim 22 wherein the control circuitry, when creating the sequence of frames depicting eye movement and lip movement of the first participant, is constructed and arranged to:

join together at least some of the image portions of the actual captured video of the first participant to dynamically generate a first frame of the sequence of frames, the first frame containing a first image of the first participant that never actually occurred, and join together at least some of the image portions of the actual captured video of the first participant to dynamically generate a second frame of the sequence of frames, the second frame containing a second image of the first participant that never actually occurred, the second image being different from the first image.

* * * * *